United States Patent [19]
White

[11] 3,890,432
[45] *July 17, 1975

[54] CATALYTIC HYDROGEN MANUFACTURE

[75] Inventor: Robert J. White, Pinole, Calif.

[73] Assignee: Chevron Research Company, San Francisco, Calif.

[*] Notice: The portion of the term of this patent subsequent to July 9, 1991.

[22] Filed: Feb. 5, 1973

[21] Appl. No.: 329,471

Related U.S. Application Data

[62] Division of Ser. No. 34,834, May 5, 1970, Pat. No. 3,759,677.

[52] U.S. Cl. ............... 423/655; 423/437; 423/564; 423/648; 252/373
[51] Int. Cl. ........ C01b 1/02; C01b 1/32; C01b 2/06
[58] Field of Search .......... 423/655, 437, 563, 564, 423/648; 48/209; 252/373

[56] References Cited
UNITED STATES PATENTS

| | | | |
|---|---|---|---|
| 2,183,301 | 12/1939 | Bossner et al. | 423/655 |
| 2,934,407 | 4/1960 | Simonek et al. | 423/655 |
| 3,252,773 | 5/1966 | Solomon et al. | 48/209 X |
| 3,317,292 | 5/1967 | Juda | 48/209 |
| 3,413,214 | 11/1968 | Galbreath | 423/655 X |
| 3,471,275 | 10/1969 | Borggreen | 48/209 |
| 3,511,194 | 5/1970 | Stookey | 48/209 UX |
| 3,576,603 | 4/1971 | Smith et al. | 423/655 |
| 3,618,331 | 11/1971 | Smith et al. | 62/23 |
| 3,759,677 | 9/1973 | White | 48/209 |

Primary Examiner—Edward Stern
Attorney, Agent, or Firm—G. F. Magdeburger; R. H. Davies; J. J. De Young

[57] ABSTRACT

A process for producing synthesis gas which comprises contacting an organic feed material, containing hydrogen and at least 10 weight percent oxygen and containing less than five weight percent sulfur, with steam in the presence of an alkali metal carbonate catalyst at an elevated temperature. Preferably the feed material is solid waste material, most preferably solid municipal waste.

2 Claims, 1 Drawing Figure

3,890,432

CATALYTIC HYDROGEN MANUFACTURE

This is a division of application Ser. No. 34,834, filed May 5, 1970 now U.S. Pat. No. 3,759,677.

BACKGROUND OF THE INVENTION

The present invention relates to the production of synthesis gas and hydrogen. More particularly, the present invention relates to the production of synthesis gas and hydrogen-containing gases by the reaction of carbonaceous material with steam. The term "synthesis gas" is used herein to mean a gas comprising hydrogen and carbon oxides.

Synthesis gas can be used for a number of purposes, for example, the carbon oxides can be removed from the synthesis gas, usually after converting essentially all of the carbon monoxide to hydrogen and carbon dioxide, and the resulting purified hydrogen gas used in hydroconversion processes such as hydrocracking to produce jet fuel or gasoline. The synthesis gas can also be used to synthesize methanol from the hydrogen and carbon oxides or to synthesize other chemicals such as ammonia when nitrogen is added to the synthesis gas either after production of the synthesis gas or preferably during the reaction used to produce the synthesis gas. The synthesis gas can be used in a Fischer Tropsch synthesis to form liquid hydrocarbons. Also, the synthesis gas can be used to form methane or it can be burned directly as a fuel gas or it can be combined with light hydrocarbons to form a fuel gas, usually after removal of at least part of the carbon oxides or a conversion of carbon monoxide to carbon dioxide.

Various methods have been suggested for the production of synthesis gas or hydrogen-rich gas mixtures. Among these methods are steam-hydrocarbon reforming, partial oxidation of hydrocarbons, Lurgi heavy hydrocarbons gasification, the traditional steam, red-hot coke reaction, and modified methods of reacting carbonaceous matter with steam and oxygen, such as described in U.S. Pat. No. 1,505,065.

The two leading processes, that is, the two processes which are most frequently used to generate hydrogen, are steam-hydrocarbon reforming and partial oxidation of hydrocarbons.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes, most of the hydrocarbons react with steam to form hydrogen and carbon oxides. The tubes containing the catalyst are located in a reforming furnace, which furnace heats the reactants in the tubes to temperatures of 1200°–1700°F. Pressures maintained in the reforming furnace tubes range from atmospheric to 450 psig. If a secondary reforming furnace or reactor is employed, pressures used for reforming may be as high as 450 psig to 700 psig. In secondary reformer reactors, part of the hydrocarbons in the effluent from the primary reformer is burned with oxygen. Because of the added expense, secondary reformers are generally not used in pure hydrogen manufacture, but are used where it is desirable to obtain a mixture of $H_2$ and $N_2$, as in ammonia manufacture. The basic reactions in the system reforming process are:

$C_nH_{2n+2}+nH_2O \rightleftarrows nCO+(2n+1)H_2$
$C_nH_{2n+2}+2nH_2O \rightleftarrows nCO_2+(3n+1)H_2$ e.g., methane-steam:
$CH_4+H_2O \rightleftarrows CO+3H_2$; and
$CH_4+2H_2O \rightleftarrows CO_2+4H_2$ In typical partial oxidation processes, a hydrocarbon is reacted with oxygen to yield hydrogen and carbon monoxide. Insufficient oxygen for complete combustion is used. The reaction may be carried out with gaseous hydrocarbons or liquid or solid hydrocarbons, for example, with methane, the reaction is:

$CH_4+\frac{1}{2} O_2 \rightleftarrows 2H_2+CO$

With heavier hydrocarbons, the reaction may be represented as follows:

$C_7H_{12}+2.8\ O_2+2.1\ H_2O \rightleftarrows 6.3\ CO+.7\ CO_2+8.1\ H_2$

Both catalytic and noncatalytic partial oxidation processes are in use. Suitable operating conditions include temperatures from 2000°F. up to about 3200°F. and pressures up to about 1200 psig, but generally pressures between 100 and 600 psig are used. Various specific partial oxidation processes are commercially available, such as the Shell Gasification Process, Fauser-Montecatini Process, and the Texaco Partial Oxidation Process.

There is substantial carbon monoxide in the hydrogen-rich gas generated by either reforming or partial oxidation. To convert the carbon monoxide to hydrogen and carbon dioxide, one or more CO shift conversion stages are typically employed. The CO shift conversion reaction is:

$CO+H_2O \rightarrow H_2+CO_2$

This reaction is typically effected by passing the carbon monoxide and $H_2O$ over a catalyst such as iron oxide activated with chromium.

Production of hydrogen and other gases from waste substances produced in the manufacture of paper from wood chips and the like has been discussed in the literature as, for example, in U.S. Pat. No. 3,317,292. In the manufacture of paper, wood chips are digested, for example, with an aqueous calcium sulfide liquid thereby forming calcium lignin sulfonate waste product in solution, leaving wood pulp behind. As disclosed in U.S. Pat. No. 3,317,292, the waste substances containing lignin-derived organic components can be converted to a gas mixture comprising hydrogen by contacting the waste material with steam in a reaction zone at an elevated temperature at least of the order of several hundred degrees centigrade. The sulfite waste liquor produced in the manufacture of paper from wood chips and the like is a relatively well-defined waste material consisting mostly of lignin-type organic compounds and certain inorganic components, including at least five weight percent sulfur calculated as the element sulfur but present usually in the form of sulfur compounds.

The use of catalysts such as potassium carbonate has been disclosed for the reaction of carbon with steam to form hydrogen as is discussed, for example, in Journal of the American Chemical Society, Vol. 43, p. 2055 (1921). However, the use of catalysts such as potassium carbonate to catalyze the reaction of organic material containing substantial amounts of oxygen, particularly waste or garbage-type material with steam to form hydrogen does not appear to be disclosed or suggested in the prior art.

U.S. Pat. No. 3,471,275 discloses a method for converting refuse or garbage-type material to gases such as gases rich in hydrogen. According to the process disclosed in U.S. Pat. No. 3,471,275, the refuse is fed to a retort and heated therein to a temperature between about 1650°F. and 2200°F. The retort is externally heated. According to the 3,471,275 patent process, steam is not generally added to the retort. Any steam which is added to the retort according to the process disclosed in the 3,471,275 patent is added to the bottom of the retort so that steam would flow countercurrent to the waste material which is introduced to the retort at the top of the retort. No catalyst is used in the 3,471,275 patent process.

SUMMARY OF THE INVENTION

According to the present invention, a process is provided for producing synthesis gas which comprises contacting an organic feed material, containing hydrogen and at least 10 weight percent oxygen and containing less than five weight percent sulfur, with steam in the presence of an alkali metal catalyst at an elevated temperature.

We have found that the defined organic feed material is converted at an unexpectedly high rate to synthesis gas when the conversion is carried out in accordance with the present invention. We have found that the rate of conversion of the organic feed material is particularly fast when a potassium carbonate catalyst is used to accelerate the reaction rate.

The present invention requires, among other factors:

1. that the organic feed material contain a minimum amount of oxygen. At least 10 percent oxygen must be contained in the feed material and we have found that 25 percent or more oxygen is much more preferable in the process of the present invention, 2. The feed must contain less than 5 weight percent sulfur, 3. the reaction of the organic feed and the steam must be carried out in the presence of a catalyst and we have found that alkali metal catalysts, particularly potassium, are extremely active in the process of the present invention.

The reason for the fast reaction rate in the process of the present invention is not completely understood, but it is believed that an important factor is the oxygen content of the organic feed material in the process of the present invention. The organic feed material, which in this specification is to be understood to contain hydrogen, as well as carbon, must contain at least 10 weight percent oxygen which can be contrasted to the essentially nil amount of oxygen present in hydrocarbon feed-stocks to synthesis gas-producing processes such as steam-light hydrocarbon reforming or hydrocarbon partial oxidation. The presence of oxygen in the organic feed material in the process of the present invention may contribute to the relatively fast reaction rate by making the feed material more susceptible to reaction with additional steam to produce hydrogen than in the case of hydrocarbon material containing little or no oxygen. We have found that it is particularly preferable in the process of the present invention to produce synthesis gas from organic feed material containing at least 25 weight percent oxygen and still more preferably, between about 35 and 70 weight percent oxygen.

We have also found that organic feed material containing the oxygen substantially in the form of polyhydroxylated compounds is particularly advantageous from the standpoint of high reaction rates with steam to form synthesis gas. Feeds containing oxygen in the form of polyhydroxylated compounds are meant to include carbohydrates such as cellulose and sugars.

The oxygen and the hydrogen content in the organic feed material are to be understood as chemically combined oxygen and hydrogen, i.e., oxygen and hydrogen which is connected through one or more chemical bonds to the carbon present in the organic feed material.

It is important in the process of the present invention that the feed material contain less than 5 weight percent sulfur. The sulfur is calculated as the element sulfur, although for those undesired and excluded feedstocks, the sulfur is usually present as a compound as, for example, an organic sulfur compound or an inorganic sulfur compound present in the feed material. Thus, it is to be understood that the organic feed material contacted with steam according to the process of the present invention is free from a high percentage of inorganic or organic sulfur compounds, i.e., that the feed contains less than 5 weight percent sulfur either as sulfur chemically combined with the organic feed material or as inorganic sulfur compounds physically mixed with the organic feed material. Feeds such as Kraft black liquor produced as a waste material in the manufacture of paper pulp are not suitable in the process of the present invention because of the relatively high content of sulfur compounds in the Kraft black liquor. It is undesirable to have substantial amounts of sulfur feed to the reaction zone in the process of the present invention because of the increased reactor cost and, more particularly, because of the increased problems in removing sulfur compounds from the synthesis gas produced in the reactor. It is preferred that the sulfur content of the organic feed material be below about 3 weight percent sulfur.

The catalyst used in the process of the present invention is preferably an alkali metal catalyst, as we have found particularly high reaction rates using alkali metal catalysts. Potassium carbonate has been found to be preferred among the alkali metal catalysts. Other catalysts comprising Group VIII metals such as nickel can be used in the process of the present invention, but the conversion rate is not as rapid as with the surprisingly active alkali metal catalysts in the process of the present invention. The alkali metal catalysts include lithium, sodium, potassium, rubidium and cesium. Preferably, the alkali metal is added to the reaction zone by contacting the feed to the reaction zone with a solution of a salt of the alkali metal catalyst. The salts of the alkali metal catalyst include salts such as sulfates and chlorides. Although it is preferred to add the alkali metal catalyst to the reaction zone in the form of a carbonate, it is suitable to add the catalyst in other forms such as hydroxides, sulfates, formates, acetates, chlorides, or other alkali metal salts.

We have found that particularly suitable organic feed material for the process of the present invention includes solid waste material, including material commonly referred to as garbage. We have found that high reaction rates are obtained in the process of the present invention for the conversion of solid waste material to synthesis gas. The term "solid waste material" or "solid waste" is used herein to include solid municipal waste or common garbage, sewage, industrial waste such as sawdust, and agricultural waste such as corn husks and other discarded cellulosic material.

According to a particularly preferred embodiment of the present invention, the feed material is solid municipal waste including what is commonly referred to as garbage, but excluding sewage. This solid municipal waste, consisting primarily of common garbage, is particularly preferred in that we have found that with simulated solid municipal waste, high conversion rates to synthesis gas can be obtained in the process of the present invention and also sanitary valuable products are produced to alleviate an important disposal and pollution problem resulting from the increasing amounts of solid municipal waste which must be disposed of daily. In addition, we have determined that the amount of solid municipal waste for a number of urban areas is roughly satisfactory from a feed requirement standpoint for the production of synthesis gas to be used in various processes mentioned previously.

Typically, the solid municipal waste includes substantial amounts of at least proteins, fats, cellulose, sugars, starches, and hydrocarbons. In this connection, "substantial amounts" is used to mean at least about one weight percent of the total solid municipal waste feed. Usually, the solid municipal waste feed will contain at least two weight percent of the above specified constituents.

The solid municipal waste feed which is used in the process of the present invention may contain a substantial amount of moisture. Thus, the term "solid" is used in distinction to free-running liquids and not to mean that the solid municipal waste material is free of moisture.

It should be understood that the feed composition for such a diverse feedstock as solid municipal waste will be subject to variation from time to time. Therefore, the composition of the solid municipal waste feed should be determined over a period of time as, for example, an average composition over a period of a day or a week's operation.

As indicated above, although solid wastes other than municipal wastes can be processed to form synthesis gas in accordance with the process of the present invention, it is particularly preferred to convert municipal waste to synthesis gas in accordance with the present invention as we have determined that the amount of municipal waste generated is particularly suited to the production of commercial amounts of hydrogen and that the municipal wastes are a surprisingly attractive feedstock in terms of synthesis gas yields.

In both the case of solid waste materials and other organic feed material satisfying the requirements of the present invention, preferred amounts of the catalysts as a weight percentage of the organic feed material are from one to fifty weight percent and particularly preferred amounts are from five to twenty weight percent. When using the particularly preferred potassium carbonate catalyst, about two to fifteen weight percent potassium carbonate is preferably impregnated into the feed before contacting the feed with steam in the reaction zone.

One of the reactions occurring in the process of the present invention is the reaction of cellulosic material or sugar-type material with steam to produce hydrogen and carbon oxides. The cellulosic and sugar-type material can be considered on the basis of a simple sugar as glucose for which the following reaction applies:

$$C_6H_{12}O_6 + 6H_2O \rightarrow 6CO_2 + 12H_2$$

Unlike a similar reaction where water is added to methane or carbon, the above reaction has a negative free energy change ($\Delta F$) at 25°C, so that, on the basis of thermodynamics, the reaction can occur at room temperatures. However, we have found that the reaction rate is very slow at room temperatures. Therefore, elevated temperatures are preferred in the reaction zone according to the process of the present invention. However, it is particularly preferred in the process of the present invention to use temperatures below 1600°F. Higher temperatures result in excessive heat requirements, increased reactor cost and also lower yields of hydrogen. The use of alkali meter carbonate catalysts in accordance with the process of the present invention greatly increases the reaction rate of the organic feed material with steam to form synthesis gas, making it particularly attractive to use temperatures below 1600°F. in the process of the present invention for the production of synthesis gas. Thus, preferably, the contacting of the organic feed material with the steam is carried out in a reaction zone at a temperature between about 500° and 1600°F. and more preferably, between about 700° and 1600°F. Temperatures between 800° and about 1200° or 1400°F. are particularly preferred. At these temperatures, we have found that the reaction of the organic feed material with steam is a surprisingly attractive route to produce hydrogen-rich gas, with relatively high $H_2$ yields and relatively low heat requirements. Temperatures between 500° and 3000°F. are operable in the process of the present invention but temperatures below 1600°F. are preferred for the reasons given above.

The process of the present invention can be carried out over a wide range of pressures from about 1 atmosphere to 200 atmospheres. According to a particularly preferred embodiment of the present invention, the pressure in the reaction zone is maintained between about 30 and 150 atmospheres. We have found that these high pressures are particularly advantageous in the reaction of solid waste material with steam while the reaction zone is maintained at a temperature between about 500° and 1600°F. Because the reaction of solid waste material with steam has been found to be fairly rapid compared, for example, to the reaction of coke or carbon with steam, a substantial rate of production of hydrogen from solid waste material can be obtained at relatively high pressures including pressures ranging from about 500 or 1000 psig up to about 2000 or 3000 psig. The relatively low temperatures preferred in the process of the present invention, i.e., temperatures below 1600°F. and more preferably below 1400°F. are important in the preferred embodiment of the present invention wherein high pressures are used in the reaction zone. The lower temperatures result in considerable savings in the cost of the reactor, particularly at the preferred high reaction pressures. High reaction pressures afford the extremely important advantage of generating synthesis gas at a high pressure so that the synthesis gas needs little or no compression before being used in a high pressure hydroconversion process such as hydrocracking or hydrotreating. Also, $CO_2$ is more economically removed from raw hydrogen generated at the preferred high pressures in accordance with the present invention because the high pressure $CO_2$ can be removed from the hydrogen by absorbing the $CO_2$ into a physical absorbent such as methanol or propylene carbonate as opposed to the more expensive means of removing $CO_2$ at low pressure using a chemical absorbent such as an amine.

In our laboratory work, we surprisingly found that low sulfur, oxygen-containing organic material reacts relatively rapidly with steam to form synthesis gas. Previous methods to form synthesis gas, as indicated above, include the reaction of carbon with steam at elevated temperatures. This is discussed, for example, in U.S. Pat. Nos. 3,605,890, 3,615,300 and 3,615,299. We have found the reaction rate of certain oxygen-containing organic material with steam to form synthesis gas to be about 10 times as fast as the reaction of carbon with steam to form synthesis gas and carbon oxides at comparable temperatures.

In the process of the present invention, it it preferred to add an oxygen-containing gas such as air or molecular oxygen to the reaction zone to burn a portion of the organic feed material with steam to form synthesis gas and carbon oxides. The heat for the reaction can also be supplied by heating the steam fed to the reaction zone to a sufficiently high temperature to supply the required amount of heat for the endothermic reaction of steam plus organic material to form synthesis gas.

In accordance with an important preferred embodiment of the present invention, the flow or organic feed material and steam feed to the reaction zone is concurrent within the reaction zone. Thus, it is preferred to feed both the organic feed material and the steam to the top or upper part of the reactor and to allow or provide for basically downward flow of the organic feed material and reactant steam in the reactor, and to withdraw produced hydrogen-rich gases from the lower part of the reactor. Operation in accordance with this preferred embodiment results in less oily material and unconverted hydrocarbons being withdrawn from the reaction zone. Also, the temperature in the reaction zone can be controlled at the relatively low levels preferred in accordance with the process of the present invention so as to further maximize the yield of synthesis gas in the reaction zone.

The conversion of organic feed material, particularly solid wastes, to synthesis gas in accordance with the present invention, operates as a heretofore unharnessed use of the sun's energy. The sun puts a great deal of radiant (as opposed to thermal) energy into the constituents that make up organic feed materials such as solid wastes, but in the past, the energy of solid waste has generally not been utilized in the United States and instead, solid waste has mostly been a nuisance and sanitation problem. Living plants manufacture carbohydrates from carbon dioxide and water in the presence of sunlight and chlorophyll by means of a complex series of reactions (heat and nutrients in the soil are also needed). Radiant energy is an important factor in the transformation. The transformation process is commonly known as photosynthesis. The carbohydrates produced by the photosynthetic process in plants can be represented by the general formula $C_a(HOH)_b$. Using the general formula of a carbohydrate, an abbreviated chemical equation to represent photosynthesis can be written as follows:

The photosynthesis of a specific carbohydrate, glucose, may be represented by the equation:

As is indicated by the −671 kilocalories after the above equation, radiant energy received from the sun is stored in carbohydrates such as the simple glucose carbohydrate in the above equation.

In the process of the present invention, clean hydrogen which has a high amount of "stored" energy is produced from garbage-type feed material including carbohydrates. Thus, it may be noted that if the hydrogen produced in accordance with the present invention is burned with oxygen, there is a release of about 52,200 Btu's per pound of hydrogen. The hydrogen is obtained from a carbohydrate (for example) by reaction of the carbohydrate with $H_2O$ requiring a heat input of about 6,600 Btu's per pound of hydrogen produced. The other 45,600 Btu's per pound of hydrogen is put in by photosynthesis. Thus, about 87 percent of the stored energy in the hydrogen produced in the present invention comes from the sun — the process of the present invention adds only another approximately 13 percent of the hydrogen's stored heat energy.

A particularly preferred overall process embodiment for producing high pressure hydrogen for use, for example, in a hydroconversion process such as hydrocracking comprises the following steps: (a) reacting the organic feed material with steam, in the presence of an alkali metal catalyst, in a reaction zone at a temperature between 500° and 3000°F. to generate a hydrogen-rich gas containing hydrogen, hydrogen sulfide, carbon monoxide, and carbon dioxide, (b) withdrawing the hydrogen-rich gas from the reaction zone at a temperature between 500° and 3000°F., (c) recovering heat from the hydrogen-rich gas by heat exchanging the hydrogen-rich gas with $H_2O$ to obtain steam, (d) using at least a portion of the steam generated in step (c) as feed steam for reaction with the organic feed material according to step (a), (e) separating $H_2S$ from hydrogen-rich gas withdrawn from heat recovery step (c), (f) shift converting carbon monoxide present in hydrogen-rich gas withdrawn from the $H_2S$ separation step to obtain additional hydrogen gas, and (h) separating carbon dioxide from the high pressure hydrogen-rich gas by physical absorption of carbon dioxide present in the high pressure hydrogen gas.

DETAILED DESCRIPTION OF THE DRAWING

Figure 1:
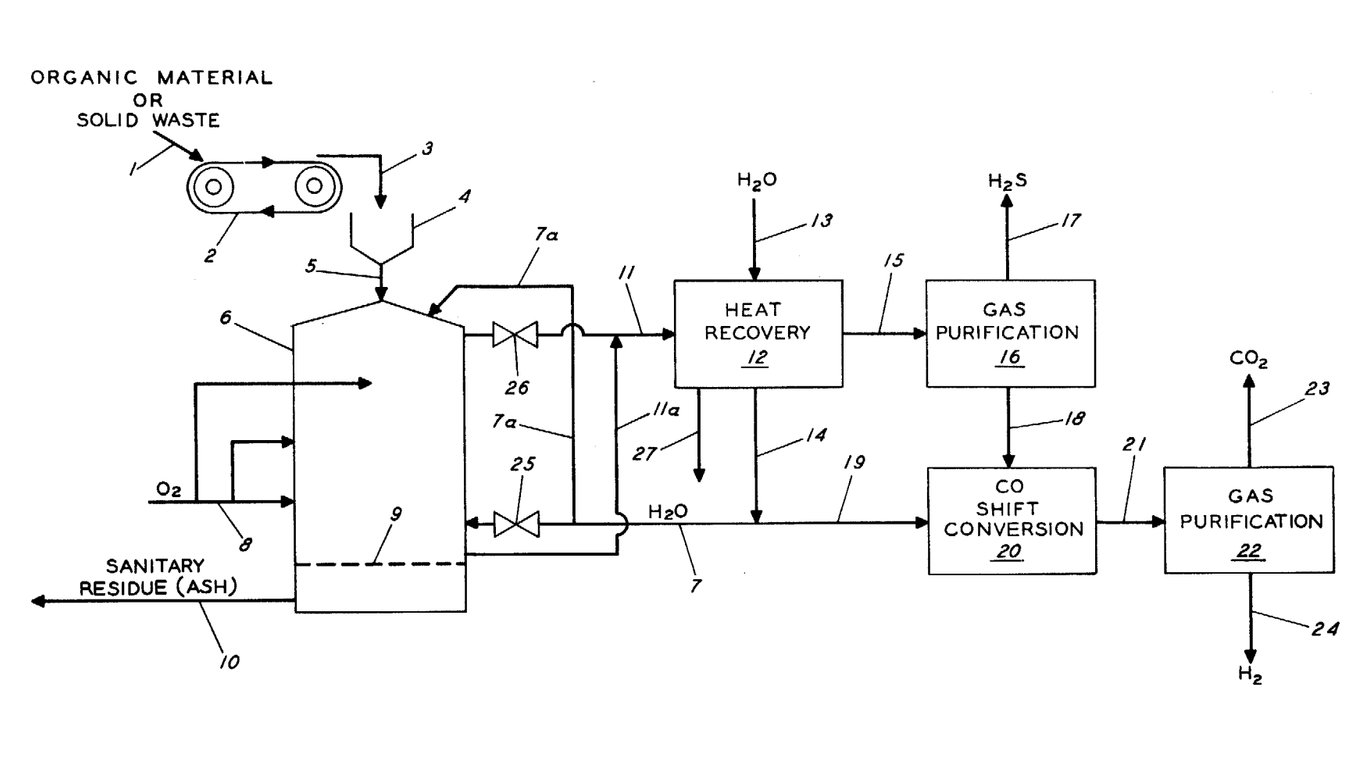
The drawing is a process flow diagram schematically indicating preferred embodiments of the present invention.

Referring now more particularly to the drawing, organic material is fed as indicated by arrow 1 to the process as is schematically indicated in the drawing. According to one preferred embodiment of the present invention, the organic feed material is ordinary municipal solid wastes or garbage. Preferably, certain constituents such as metals and, in particular, iron-containing material, is removed from the solid wastes prior to reacting the solid wastes with steam. The constituents which make up the solid wastes generally include clothing, food particles and food peels, plastics, paper, cardboard, wood, etc. The process of the present invention is preferably applied to ordinary municipal or city garbage.

Referring again to the drawing, a conveyor belt, as indicated in the drawing by numeral 2, can be used to transport the organic feed material so that it falls as indicated by arrow 3 into a hopper 4 for feeding to reactor 6 via line 5. In reactor 6, the organic feed material is contacted with steam introduced via line 7 or via line 7a. The steam and organic feed material react to form synthesis gas (hydrogen and carbon oxides) and usually minor amounts of various other gases such as hydrogen sulfide.

The alkali metal catalyst can be added to reaction zone 6 separately as, for example, by introducing an aqueous solution containing the catalyst to the receiving hopper 4. The alkali catalysts in the form, for example, of an aqueous solution of potassium carbonate or sodium carbonate, can also be impregnated onto the organic feed material before the organic feed material is introduced to reaction zone 6.

As indicated previously, the reaction of the organic feed material with steam to form hydrogen is basically an endothermic reaction. Therefore, heat must be supplied to the reaction zone. Preferably, the heat is obtained by burning a portion of the garbage with oxygen introduced to the reaction zone via line 8. In the case of hydrogen production for ammonia synthesis, it is preferred to use air as the source of oxygen to the reaction zone so that a mixture of nitrogen and hydrogen can be produced for ammonia synthesis. When relatively pure hydrogen is required, then it is preferred to use molecular or purified oxygen as the oxygen source. Heat can be supplied to the reaction zone 6 by other means as, for example, direct input of heat to the reaction zone by means of heating coils or hot tubes. Also, the overall heat balance may be made by heating the steam to the reaction zone to a high temperature substantially above that temperature to which the steam can be heated by simply recovering heat present in the effluent from the reaction zone.

According to a preferred embodiment of the process of the present invention, the temperature in the reactor, i.e., in reactor 6, is controlled by burning a portion of and recycling a relatively large amount of the synthesis gas effluent from heat recovery zone 12 back to the reactor. Particularly, it is preferred to recycle about 15-25 parts by weight of effluent synthesis gas back to the reactor compared to the parts by weight oxygen used for combustion. Preferably, the oxygen is burned with small portion of the recycle synthesis gas in a combustion chamber to obtain a temperature in the order of about 1500° to 1900°F. in the combustion chamber and the heated recycle synthesis gas effluent is then introduced to reactor 6 to obtain a temperature between about 700° and 1600°F. and preferably about 1200° – 1400°F. in the reactor.

As indicated in the drawing, the sanitary residue remaining from the organic feed material can be removed from the lower part of the reaction zone after it has fallen through a grating, as indicated by numeral 9. Mechanical apparatus and means used for the reaction of carbonaceous material such as coal and similar material can be adapted to the process of the present invention wherein material such as solid wastes are reacted with steam and a sanitary residue or ash remains. Thus, it is apparent that various mechanical schemes can be used for the reactor in the process of the present invention.

Preferably, the reaction is carried out at a temperature within the range of about 700° to 1600°F. and temperatures in the range of about 800° to 1400°F. have been found to be particularly attractive in terms of high synthesis gas yield. Usually, there will be a temperature gradient in the reactor with a somewhat higher temperature prevailing in the lower part of the reactor. The upper part of the reactor typically is cooled somewhat relative to the lower part of the reactor because the solid waste material is being heated in this zone. In any event, the gases removed from the reactor via line 11 are still at an elevated temperature, usually in the range of about 1000°F. These hydrogen-rich hot gases are passed via line 11 to heat recovery zone 12.

This process can be carried out at pressures of one atmosphere to 150 atmospheres, but preferable pressures are 4 – 20 atmospheres. The reaction of solid waste material with steam to form synthesis gas is far more thermodynamically favorable than a similar reaction for either $CH_4$, C, coke, coal, or hydrocarbons. Therefore, it is possible to carry this reaction out at much greater pressures than are used with the other feedstocks. Thus, particularly preferred reaction pressures are between about 30 and 150 atmospheres. These high pressures minimize or eliminate the need for subsequent compression of the hydrogen gas produced as, for example when the hydrogen gas is to be used in a high pressure hydroconversion process.

The steam for the process of the present invention can be generated in various manners, but is is preferred to recover heat present in the effluent gases from reaction zone 6 by heat exchange of the hot effluent gases from reactor 6 with water in heat recovery zone 12 to thereby generate steam removed via line 14 from heat recovery zone 12. It necessary, additional heat may be put into the steam in line 14 or line 7 before it is passed via line 7 to reactor 6.

In the process of the present invention, it is preferred to utilize a portion of the steam generated in heat recovery zone 12 in CO shift conversion zone 20, as is indicated by the steam passed via line 19.

In heat recovery zone 12, $H_2O$ and oily material withdrawn in the gaseous or vapor stream via line 11 or 11a from reactor 6 is condensed. The condensed $H_2O$ will typically contain various gases produced in reactor 6 such as HCl, HBr, HI, $NH_3$, HF, etc., as well as some $CO_2$, CO and $H_2S$. The oily phase of the liquid condensed out of the hydrogen-rich gas withdrawn from reactor 6 will typically contain hydrocarbons and oxygenated hydrocarbon components such as methanol, acetic acid, formaldehyde, formic acid, acetone, etc.

The condensed aqueous phase and oily phase are shown as schematically withdrawn from the process via line 27. The materials withdrawn via line 27 can be passed to various further processing as, for example, processing for the recovery of oil and the separation of various chemicals.

In accordance with a particularly preferred embodiment of the process of the present invention, the flow of steam and solid waste material in reactor 6 is essentially concurrent as opposed to countercurrent flow. Thus, the solid waste material is introduced into reactor 6 via line 5 and according to this preferred embodiment, steam is introduced to reactor 6 at the top of reactor 6 via line 7a. The upper part of the reactor will be cooler than the lower part of the reactor in most instances because of the relatively low temperature of the solid waste material introduced to the reactor. However, after a portion of the solid waste material has been reacted with oxygen to supply heat, the temperature will rise. Thus, the lower part of the reactor will be at a higher temperature than the upper part of the reactor. According to this preferred embodiment of the present invention, the raw hydrogen-rich gas is withdrawn from reactor 6 in the lower part of the reactor via line 11a. Operation in accordance with this preferred embodiment affords the advantage of reducing the amount of oily substances withdrawn from reactor 6 by converting these oily substances to synthesis gas or by burning the oil substances in reactor 6. In counterflow operation of reactor 6, steam introduced at the lower part of the reactor tends to strip or retort a certain amount of oil out of the solid waste feed to the upper part of reactor 6. In concurrent flow of the solid waste material and steam, this stripping or retorting is substantially reduced and the raw hydrogen gas is withdrawn from a relatively hot zone of the reactor so that oily material obtained from the solid waste material will be substantially reduced by reaction with steam to form synthesis gas and/or by oxidation with oxygen to yield heat.

Valves 25 and 26 are closed when it is desired to operate reactor 6 with concurrent flow of solid waste material and steam.

The gas withdrawn via 11 or 11a is the basic synthesis gas produced in accordance with the present invention. Zones 12, 16, 20 and 22 relate to further treatment of this synthesis gas which is particularly preferred in the production of a relatively pure hydrogen steam and it is to be understood that these subsequent steps can be altered when other final products are desired as, for example, in the case of methanol production.

According to the preferred overall process embodiment shown in the drawing, the cooled gases from heat recovery zone 12 are passed via line 15 to gas purification zone 16. Usually, one or more additional cooling steps will be applied to the gases removed from zone 20 before they are purified in gas purification zone 16.

In gas purification zone 16, $H_2S$ which may be present in the effluent from reactor 6 is removed, preferably by scrubbing the hydrogen-rich gas with an $H_2S$ absorbent. Various gas purification means may be employed in gas purification zone 16. The use of mono-ethanol amine (MEA) is a preferred absorbent for removing $H_2S$ and other sulfur compounds. A portion of the carbon dioxide present in the gases from reactor 6 are generally removed from the hydrogen-rich gas at the same time $H_2S$ is removed from the hydrogen-rich gas, but it is preferred not to remove carbon monoxide from the hydrogen-rich gas in gas purification zone 16. $H_2S$ present in the hydrogen-rich gas produced in reactor 6 and removed from the hydrogen in gas purification zone 16 can be passed to other processing. For example, the $H_2S$ can be passed via line 17 from gas purification zone 16 to a Claus process for the production of sulfur. Usually, the $H_2S$ will contain some carbon dioxide, but preferably only small amounts of carbon monoxide.

After at least $H_2S$ removal from the hydrogen-rich gas in gas purification zone 16, the hydrogen-rich gas is fed via line 18 to CO shift conversion zone 20. In the CO shift conversion zone, CO present in the hydrogen-rich gas is reacted with steam added to the CO shift conversion zone to form $CO_2$ and additional hydrogen.

Hydrogen-rich gas containing only small amounts of CO, for example, between about 0.2 and 2.0 volume percent CO, is withdrawn from CO shift conversion zone 20 via line 21. The hydrogen-rich gas from CO shift conversion can be directly passed to the gas purification zone 22 for removal of $CO_2$ using an absorbent which is selective for $CO_2$ as opposed to hydrogen, such as mono-ethanol amine.

However, it is preferred to centrifugally compress the hydrogen-carbon dioxide gas mixture from the CO shift conversion zone prior to removing the $CO_2$. It is particularly preferred to centrifugally compress the $H_2$—$CO_2$ gas and then remove $CO_2$ by physical absorption using a solvent such as propylene carbonate or methanol. The use of centrifugal compressors for hydrogen-carbon dioxide compression is discussed in more detail in U.S. Pat. Nos. 3,618,331, 3,551,106 and 3,532,467. The disclosures of these applications, particularly those portions relating to hydrogen-carbon dioxide centrifugal compression and also the disclosure relating to CO shift conversion and hydrogen gas purification are incorporated by reference into the present patent application.

In accordance with that preferred overall process embodiment of the present invention wherein the hydrogen-carbon dioxide gas from shift conversion is centrifugally compressed and then treated for $CO_2$ removal with a physical absorbent, the hydrogen withdrawn via line 24 from gas purification zone 22 usually will be at sufficiently high pressure as, for example, 1000 to 2500 psig, for use of the hydrogen in a high pressure hydroconversion process such as catalytic hydrocracking. In other instances, for example when the hydrogen produced in the process of the present invention is to be used as a fuel gas blending component, little or no compression of the hydrogen gas produced in reactor 6 is usually necessary because reactor 6 is preferably operated at a pressure between about 4 and 20 atmospheres.

EXAMPLES

1. Fifty grams of organic feed material was charged to a one-liter quartz reactor. The organic feed material used in this instance was simulated solid municipal waste composed of 50 weight percent paper, 10 weight percent sawdust, 3 weight percent wool, 2 weight percent plastic, 10 weight percent cotton, 10 weight percent iron, 2 weight percent aluminum, and 13 weight percent food peels such as orange peels, etc. The oxygen contact of this particular organic feed material was approximately 50 percent by weight excluding the metallic materials, i.e., iron and aluminum in the reactor charge.

Fifty-three milliliters of $H_2O$ was added to the quartz reactor over a four-hour period. The internal reaction zone in the reactor was maintained at a temperature of about 1200° to 1400°F. during most of the reaction time. No catalyst was used in this laboratory run.

Over the four-hour period, the total gas production was approximately 22 liters. The maximum gas production rate during the four-hour run period was about 10 liters per hour. The gas produced contained about 60 volume percent hydrogen with the remainder being mostly $CO_2$ and CO.

Remaining from 50 grams charge to the reactor was 11.8 grams of residue. 6.3 grams of this residue was iron and aluminum. The carbon, hydrogen, oxygen elemental analysis of the organic residue was about 85 weight percent C, about 1.4 weight percent H, and about 14 weight percent O.

The above results illustrate that solid waste-type material can be converted to substantial amounts of raw hydrogen with the simultaneous production of a residue which is sanitary because of the high temperature treatment of the solid waste material and the breaking down of the solid waste material into various constituents. The results also illustrate that the hydrogen can be produced at a fairly high rate; the rate of hydrogen production from the garbage was surprisingly found to be considerably higher than the rate of hydrogen production from carbon by reacting carbon with $H_2O$ under similar temperature conditions. 2. In a subsequent laboratory run, 50 grams of simulated solid municipal waste having the same composition as in the preceding example was reacted with steam in the presence of 16.6 weight percent potassium carbonate catalyst based on the 50 grams of solid municipal waste feed. The alkali metal catalyst resulted in a surprising increase in the hydrogen gas production. Compared to 22 liters of gas produced over 4 hours in the preceding example with no catalyst, 54.6 liters of gas were produced in this run using the alkali metal catalyst. Compared to a maximum gas production rate of 10 liters per hour in the preceding example, the gas production rate in this run using an alkali metal catalyst was 24 liters per hour.

The composition of the gas produced was approximately as follows:

| | |
|---|---|
| $C_1$ | 5.2 volume percent |
| $C_2$-$C_5$ | 2.1 volume percent |
| CO | 6.8 volume percent |
| $CO_2$ | 21.6 volume percent |
| $H_2$ | 64.3 volume percent |

The above gas analysis was based on approximately 18.1 liters of gas collected while the reaction zone temperature was raised, by electrical heating of the reactor, from about 800° to 1200°F. When heating the solid waste feed from 1200°–1400°F., 27.6 liters of gas was recovered having the composition shown below:

| | |
|---|---|
| $C_1$ | 0.5 volume percent |
| $C_2$-$C_5$ | Nil |
| CO | 17.2 volume percent |
| $CO_2$ | 18.7 volume percent |
| $H_2$ | 63.6 volume percent |

The residue recovered after this run was about 12.4 grams composed of 5.6 grams iron and iron oxide, 0.8 grams aluminum and aluminum oxide, 5.0 grams potassium carbonate, and 1.0 gram water insoluble ash.

3. Another run was carried out using 50 grams of simulated solid municipal waste having the same composition as in the preceding examples, but using 10 weight percent sodium carbonate catalyst. The sodium carbonate catalyst was found to be very effective in increasing the rate of hydrogen production. The maximum rate of hydrogen production during this run was 34 liters per hour compared to only 10 liters per hour in the example 1 above, wherein no catalyst was used. The total amount of hydrogen-rich gas produced in this run was 47.1 liters.

The temperature range during this run was essentially the same as that in the preceding examples with the maximum temperature being 1425°F.

The residue recovered after the run was about 12.2 grams composed of 5.4 grams iron and iron oxide, 0.8 gram aluminum and aluminum oxide, 1.5 grams water insoluble ash, and 3.2 grams sodium carbonate.

The amount of $H_2O$ added during this run was about 16 milliliters per hour, compared to 14 milliliters per hour for the previous example wherein the potassium carbonate catalyst was used.

4. The use of Group VIII metal catalysts including catalysts comprising metals such as nickel have also been found to be attractive in the process of the present invention. Usually, the Group VIII metal is present as a compound such as an oxide or sulfide, but the metal may be present in a reduced state. The Group VIII metal catalysts have not been found to be as active in the catalyzing of the steam-organic feed material reaction as the surprisingly highly active alkali metal catalysts, particularly the potassium carbonate catalyst.

In a run using 50 grams of paper towels (the paper towels had a combined oxygen content of about 30–65 weight percent), nickel catalyst was added by impregnating the paper towels with an aqueous nickel nitrate solution. About 1.5 weight percent nickel calculated as the metal nickel was deposited on the paper towels in the form of nickel nitrate. The quartz reactor containing the nickel nitrate impregnated paper towels was heated to a temperature of about 1200°F. Over a period of about 4 hours, 28.3 liters of gas was obtained. The analysis of the gas was as follows: 1.1 volume percent methane, 10.6 volume percent CO, 23.9 volume percent $CO_2$, 64.3 volume percent hydrogen.

About 4.6 grams of residue was recovered, approximately one gram of which was nickel.

5. As is indicated above, the process of the present invention can advantageously be applied to the conversion of sewage to hydrogen, as we have found that relatively rapid reaction rates are obtained when sewage is contacted with steam in the presence of alkali metal catalysts at elevated temperatures. It is particularly preferred to use temperatures below 1600°F. for reacting sewage with steam to produce hydrogen when employing a process in accordance with the present invention.

Fifty grams of dried Milwaukee sewage, commonly referred to as Milorganite, was impregnated with about 10 weight percent sodium carbonate and then reacted with steam at a temperature within the range of about 1200° – 1440°F. The reaction was carried out over a period of about 6 hours and 39 liters of gas was produced. The gas contained about 63 volume percent hydrogen. 12.3 grams of residue remained. About 2.5 grams of the residue was soluble in water and could be processed to recover a large amount of the sodium carbonate catalyst for re-use in the catalytic reaction.

Although various embodiments of the invention have been described, it is to be understood that they are meant to be illustrative only and not limiting. Certain features may be changed without departing from the spirit or scope of the invention. It is apparent that the present invention has broad application to the production of synthesis gas or gases comprising hydrogen from certain oxygenated low sulfur content organic feed material charges by reaction of the organic feed material with steam. Accordingly, the invention is not to be construed as limited to the specific embodiments or examples discussed but only as defined in the appended claims.

I claim:

1. A process for converting solid organic waste containing at least 10 weight percent oxygen and less than 5 weight percent sulfur to a synthesis gas and a sanitary inorganic residue and for separating gases obtained during the conversion of the solid waste into valuable gas streams which comprises:

a. reacting the solid waste with steam in a reaction zone at a temperature between 500° and 3000°F. to generate a hydrogen-rich gas containing hydrogen, hydrogen sulfide, carbon monoxide, and carbon dioxide, said reaction being catalyzed by the presence in the solid feed of potassium carbonate or sodium carbonate, based on the amount of the solid organic waste material feed, in the range of from about 1 to 50 weight percent, b. withdrawing the hydrogen-rich gas from the reaction zone at a temperature between 500° and 3000°F., c. recovering heat from the hydrogen-rich gas by heat exchanging the hydrogen-rich gas with $H_2O$ to obtain steam, d. using at least a portion of the steam generated in step (c) as feed steam for reaction with the solid municipal waste according to step (a), e. separating $H_2S$ from hydrogen-rich gas withdrawn from heat recovery step (c), f. shift converting carbon monoxide present in hydrogen-rich gas withdrawn from the $H_2S$ separation step to obtain additional hydrogen and carbon dioxide, and g. separating carbon dioxide from the hydrogen-rich gas withdrawn from the carbon monoxide shift conversion step.

2. A process for converting solid organic waste containing at least 10 weight percent oxygen and less than 5 weight percent sulfur to a hydrogen-rich gas and a sanitary inorganic residue and for separating gases obtained during the conversion of the solid waste into valuable gas streams which comprises:

a. reacting the solid waste with steam in a reaction zone at a temperature between 500° and 3000°F. to generate a hydrogen-rich gas containing hydrogen, hydrogen sulfide, carbon monoxide, and carbon dioxide, said reaction being catalyzed by the presence in the solid feed of potassium carbonate or sodium carbonate, based on the amount of the solid organic waste material feed, in the range of from about 1 to 50 weight percent, b. withdrawing the hydrogen-rich gas from the reaction zone at a temperature between 500° and 3000°F., c. recovering heat from the hydrogen-rich gas by heat exchanging the hydrogen-rich gas with $H_2O$ to obtain steam, d. using at least a portion of the steam generated in step (c) as feed steam for reaction with the solid waste according to step (a), e. separating $H_2S$ from hydrogen-rich gas withdrawn from heat recovery step (c), f. shift converting carbon monoxide present in hydrogen-rich gas withdrawn from the $H_2S$ separation step to obtain additional hydrogen and carbon dioxide, g. centrifugally compressing hydrogen-carbon dioxide gas withdrawn from step (f) to obtain a high-pressure hydrogen gas, and h. separating carbon dioxide from the high-pressure hydrogen-rich gas by physical absorption of carbon dioxide present in the high-pressure hydrogen gas.

* * * * *

UNITED STATES PATENT AND TRADEMARK OFFICE
CERTIFICATE OF CORRECTION

PATENT NO. : 3,890,432
DATED : June 17, 1975
INVENTOR(S) : Robert J. White

It is certified that error appears in the above-identified patent and that said Letters Patent are hereby corrected as shown below:

Title Page, "[45] *July 17, 1975" should read
   --[45] *June 17, 1975--.

Col. 1, line 65, "system" should read --steam--.

Col. 5, line 65, "sugar as" should read --sugar such as--.

Col. 6, line 13, "meter carbonate" should read
   --metal carbonate--.

Col. 10, line 24, "is is" should read --it is--.

Col. 10, line 29, "It necessary," should read
   --If necessary,--.

Col. 10, lines 56-57, "into reactor" should read
   --to reactor--.

Col. 11, line 7, "oil substances" should read
   --oily substances--.

Col. 11, line 26, "hydrogen steam" should read
   --hydrogen stream--.

Col. 12, lines 43-44, "oxygen contact" should read
   --oxygen content--.

Col. 12, line 59, "from 50" should read --from the 50--.

Signed and Sealed this twenty-third Day of December 1975

[SEAL]

Attest:

RUTH C. MASON
*Attesting Officer*

C. MARSHALL DANN
*Commissioner of Patents and Trademarks*